Patented June 12, 1951

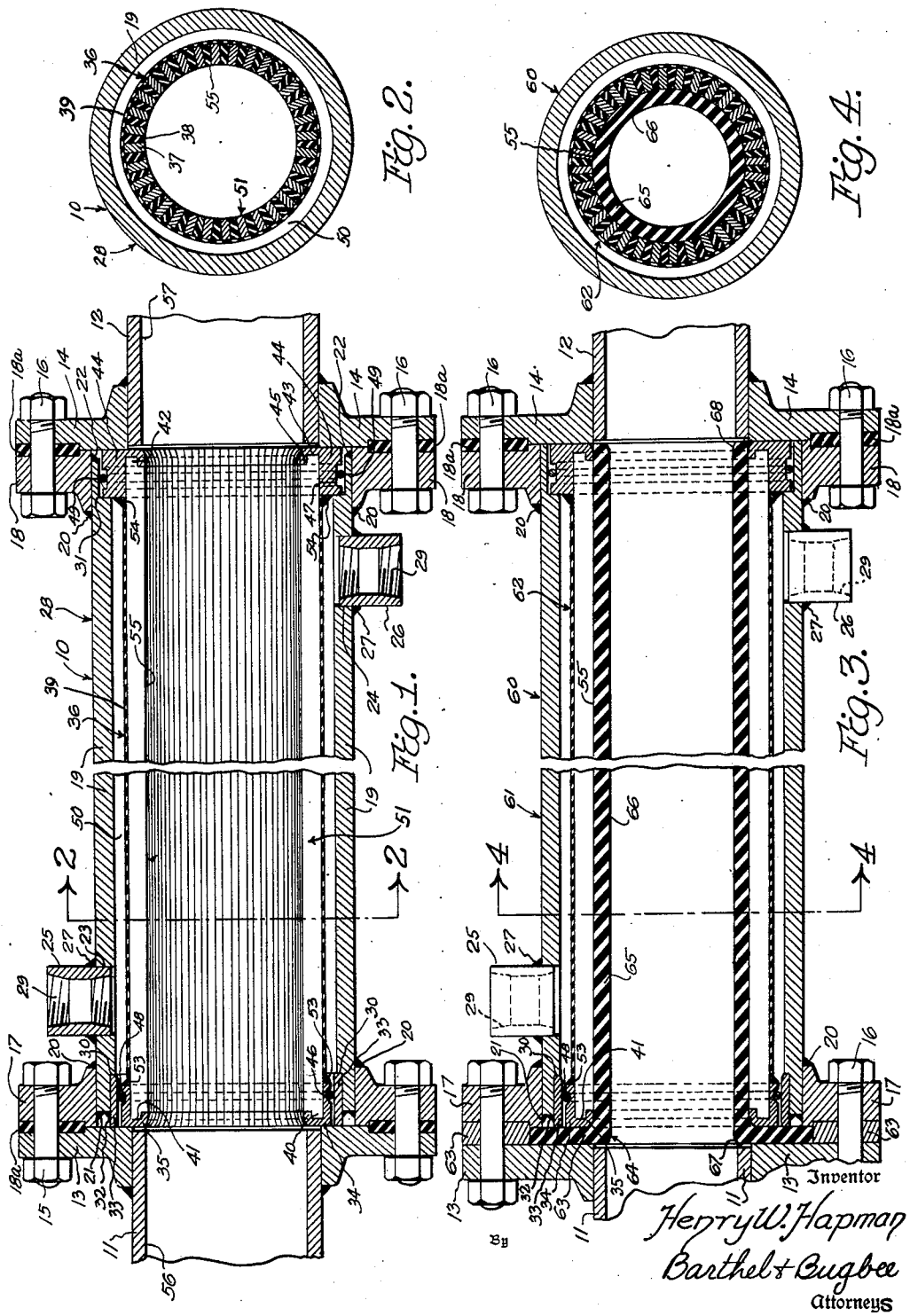
June 12, 1951     H. W. HAPMAN     2,556,183
FLIGHT CONVEYER PRESSURE SEALING DEVICE
Filed March 23, 1949     2 Sheets-Sheet 1
Inventor
Henry W. Hapman
By Barthel & Bugbee
Attorneys

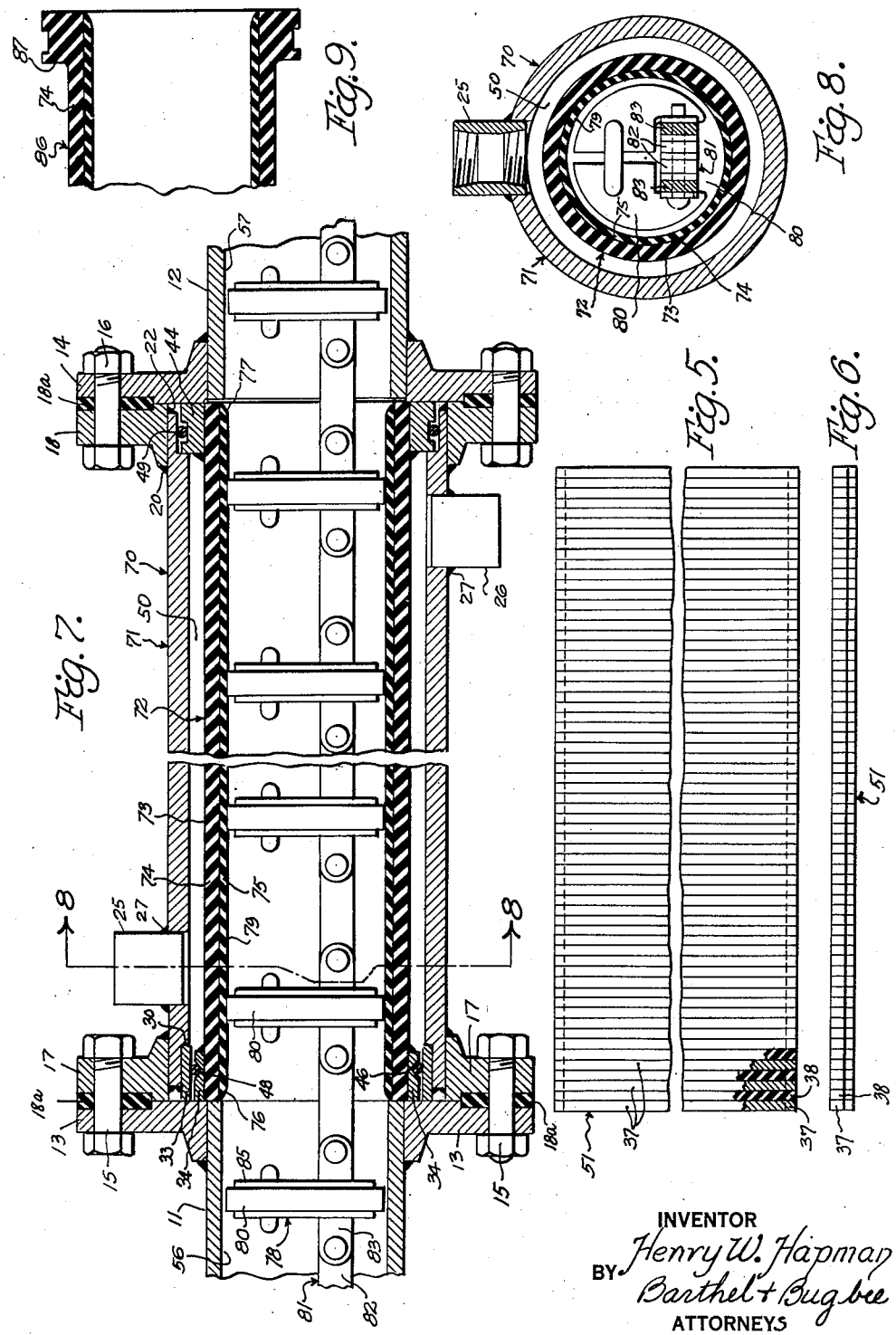

2,556,183

UNITED STATES PATENT OFFICE 2,556,183

FLIGHT CONVEYER PRESSURE SEALING DEVICE

Henry W. Hapman, Detroit, Mich., assignor, by mesne assignments, of forty per cent to Hannah Jane Hapman, Detroit, Mich.

Application March 23, 1949, Serial No. 83,008

10 Claims. (Cl. 198—168)

This invention relates to flight conveyors and, in particular, to sealing devices for flight conveyors.

One object of this invention is to provide an improved pressure-sealing device for flight conveyors for sealing off a portion of the conveyor so as to permit subjecting it to pressure without leakage, wherein the device is capable of withstanding an abnormally high operating temperature without excessive deterioration of the device under operating conditions which would not permit the use of an ordinary sealing device due to the inability of the rubber or synthetic rubber to withstand the heat.

Another object is to provide an improved pressure-sealing device for flight conveyors wherein the conveyor flights engage a contractible tubular structure composed of alternate longitudinal strips or bars of metal and rubber-like material capable of being flexed radially, such as by gas or liquid pressure exerted on the outside thereof, to urge the tubular structure into sealing engagement with the conveyor flights, the metal bars or strips also assisting in transmitting heat so as to carry away excessive heat which might otherwise do irreparable injury to the rubber-like material at high operating temperatures.

Another object is to provide an improved pressure-sealing device for flight conveyors as set forth in the preceding objects, wherein the tubular structure is additionally provided with a replaceable tubular liner or sleeve of rubber-like material for engaging the conveyor flights under operating conditions of medium temperatures where it is necessary or desirable not to have metal exposed to contact with either the conveyed material or with the fluids used in treating such materials, or with the flights themselves.

Another object is to provide an improved modified pressure-sealing device for flight conveyors of the foregoing character wherein the tubular structure of bars of alternate metal and rubber-like material is quickly and easily removable for repair or replacement purposes.

Another object is to provide an improved process of making and assembling the tubular structure of alternate metal and rubber-like bars employed in the flight conveyor sealing devices of the foregoing objects, wherein the bars of metal and unvulcanized rubber-like material are assembled side by side in alternate sequence upon a flat surface and then transferred to a cylindrical mandril of the proper diameter and vulcanized in this position so as to unite the bars into the desired tubular structure, the rubber-like bars becoming deformed into trapezoidal or keystone cross-section while on the mandril.

In the drawings:

Figure 1 is a central vertical longitudinal section through a flight conveyor pressure-sealing device, according to a preferred form of the invention, employing a contractible tubular structure of alternate metal and rubber-like bars adapted to engage the conveyor flights and withstand abnormally high operating temperatures.

Figure 2 is a vertical cross-section along the line 2—2 in Figure 1;

Figure 3 is a central vertical section through a flight conveyor pressure-sealing device, according to a modification of the invention, wherein a replaceable tubular wear member of rubber-like material is removably installed inside the tubular structure;

Figure 4 is a vertical cross-section along the line 4—4 in Figure 3;

Figure 5 is a top plan view, partly in horizontal section, of a layout or assembly of alternate metal and rubber-like bars prior to forming the tubular structure;

Figure 6 is a side elevation of the assembly shown in Figure 5;

Figure 7 is a central vertical longitudinal section, according to a further modification of the invention, through a flight conveyor pressure-sealing device wherein a composite tubular member of different kinds of rubber-like material is provided for engaging and sealing the conveyor flights as they pass through the sealing device;

Figure 8 is a vertical cross-section along the line 8—8 in Figure 7; and

Figure 9 is a further modification of the composite tubular member shown in Figure 7.

Flight conveyor sealing device for high temperature operation

Referring to the drawings in detail, Figures 1 and 2 show a flight conveyor sealing device, generally designated 10, which is capable of being installed in a gap between spaced conveyor conduits 11 and 12 having their respecitve flanges 13 and 14 bolted as at 15 and 16 to the corresponding flanges 17 and 18 at the forward and rearward ends of the sealing device 10. The flanges 13 and 17 as well as the flanges 14 and 18 are annularly recessed to receive sealing gaskets 18a of elastic deformable material such as rubber or synthetic rubber, or other suitable gasket material adapted to prevent leakage between the above-mentioned flanges. The flanges 17 and 18 at the forward and rearward ends of the sealing device 10 are interconnected by a tubular casing member 19 welded or otherwise secured thereto as at 20, 21 and 22. The casing member 19 is provided with upper and lower bores 23 and 24 respectively at its opposite ends adapted to receive tubular inlet and outlet connecting or coupling members 25 and 26 respectively secured therein by welding as at 27. The tubular member 19, flanges 17 and 18 and coupling members 25 and 26 in assembly form a casing structure generally designated 28. The coupling members 25 and 26 are threaded as at 29 respectively for receiving the correspondingly threaded ends of the inlet and outlet pipes (not shown).

The tubular casing member 19 is provided at its opposite ends with internal annular recesses 30 and 31. Seated in the annular recess 30 and secured thereto by welding as at 32 is an annular band or ring 33 (Figure 1). The ring 33 serves to receive a flanged ring 34, the inwardly flared flanged portion 35 of which is seated against the inner surface of the flange 13. The flanged ring 34 forms the forward end of a contractile tubular structure, generally designated 36, and is composed of alternate bars or strips of metal 37 and rubber-like material 38, such as rubber or synthetic rubber, arranged in an annular path (Figure 2) and surrounded by a thin tubular layer 39 of rubber-like material such as rubber or synthetic rubber. The opposite ends of the bars 37 and 38 are provided with projections 40 adapted to be received in the recesses 41 of the flanged ring 34. Similarly, the rearward end of the bars 37 and 38 are provided with projections 42 received in recesses 43 in a flanged ring 44 having an inwardly flared flange 45 (Figure 1). The rings 44 and 34 are provided with annular peripheral grooves 46 and 47 in which are seated sealing rings 48 and 49 respectively. The sealing rings 48 and 49, commonly known as "O rings," are conventional and are of such a nature that when pressure is exerted upon them, such as by the attempted leakage of pressure fluid, the sealing ring distorts from circular to oval cross-section. When so distorted, the sealing rings 48 and 49 are jammed tightly against the adjacent walls, sealing the annular crack securely against leakage. The forward or leading flanged ring 34 is somewhat smaller in diameter than the rearward or trailing ring 44 in order to facilitate insertion of the tubular structure 36 within the casing member 19. These are separated from one another by an annular inflation chamber 50 into which pressure fluid may be introduced for forcing the tubular structure 36 inward to engage the conveyor flights.

In assembling the tubular structure 36 (Figures 5 and 6), alternate bars or strips of metal 37 and uncured rubber-like material 38, such as uncured rubber or synthetic rubber, are laid down side by side in alternate sequence upon a flat surface such as a table, a sufficient number being chosen to form the desired diameter of tubular structure. The metal bars 37 are preferably of steel coated with brass applied electrolytically or otherwise in order to give good adhesion or bond to the rubber-like strips 38. The assembly, generally designated 51, is then placed around a cylindrical mandril in a lathe (not shown) of the desired diameter, the bars or strips 38 of uncured rubber compressing from rectangular cross-section into trapezoidal or keystone cross-section (Figure 2). The layer 39 of uncured rubber, synthetic rubber, or other un-vulcanized rubber-like material, is then placed around the assembly from one end to the other and secured at its opposite ends by annular portions 53 and 54 of the same material to the rings 34 and 44 respectively. A filler bar (not shown) of different width may be substituted for one of the bars 37 or 38, if necessary, in order to make the arrangement come out right without the formation of gaps. The entire assembly 51 thus formed on the mandril in the lathe (not shown) is then cured or vulcanized in position, so that the rubber, synthetic rubber or other rubber-like material assumes its final form as the contractible tubular structure 36. The assembly 36 may optionally be wrapped with several layers of canvas criss-crossed during wrapping to control the diameter during vulcanization.

During assembly the tubular structure 36 is inserted in the casing structure 28 from the rearward end thereof by first passing the smaller ring 34 through the stepped opening or recess 31 adjacent the rearward flange 18, with the sealing members 48 and 49 in position in their respective grooves 46 and 47. The ring 34 with its sealing ring 48 comes to rest within the ring 33 (Figure 1) while the ring 44 comes to rest within the recess 31. The sealing device 10 can then be assembled in the space between the flanges 13 and 14 of the conveyor conduits 11 and 12 and the bolts 15 and 16 inserted and tightened. The tubular structure 36 has a central bore 55 which is of somewhat smaller diameter than the bores 56 and 57 of the conveyor conduits 11 and 12 respectively.

In the operation of the form of the invention shown in Figures 1 and 2, fluid inlet and outlet pipes are attached respectively to the inlet and outlet coupling members 25 and 26 and steam, compressed air or water or other liquid or gas under pressure supplied to the inlet coupling 25. Steam or other heating medium is used where it is desired to apply heat to the material being conveyed, but if the material is already developing heat, as by a chemical reaction taking place while it is being conveyed, the steam may be replaced by a cooling fluid. In either case, the metal bars 37 serve not only to engage the peripheries of the flights of the flight conveyor as guides and wear members (such as that shown in Figure 7) but also to serve as heat exchangers for conveying heat into or out of the central bore 55 through the contractible tubular structure 36. In order to develop pressure sufficient to flex the bars 37 and 38 inward to constrict the bore 55 and seal the conveyor flights, a throttle valve (not shown) may be employed in the outlet pipe attached to the outlet coupling 26 so as to set up a back pressure in the inflation chamber 50.

The flight conveyor (Figure 7) is, of course, trained through the bores 56, 55 and 57 and operated in the usual way. The flexing of the contractible tubular structure 36 occurring in response to the pressure fluid flowing into the inflation chamber 50 seals the flights as they pass through the bore 55 and prevents leakage of the pressure standing in the conduit 11 into the conduit 12. In order that the bore 55 shall remain accurately true, a boring tool can be run through it while it is under pressure so that its inner wall will be truly cylindrical.

The present pressure sealing device 10 can be used successfully at temperatures as high as 600° F. and regularly at temperatures of around 500° F. where ordinary rubber pressure sealing devices would fail because of the intense heat involved.

The flight conveyor, the details of which form no part of the present invention, may, if necessary, have metal flights to sustain the high heat instead of the customary rubber or synthetic rubber flights.

*Pressure sealing device with resilient wear sleeve*

The modified pressure sealing device generally designated 60 shown in Figures 3 and 4 is generally similar to the pressure sealing device 10 shown in Figures 1 and 2 and includes a similar casing structure 61 and contractible tubular structure 62. These are of similar construction to the structures 28 and 36 of Figures 1 and 2 and corresponding parts bear similar reference numerals. The flanges 13 and 17 of Figure 3, however, are separated from one another by a relatively incompressible gasket 63 in place of the gasket 18a of elastic deformable material such as rubber or synthetic rubber in Figure 1. This construction provides a space between the inner ends of the flanges 13 and 17 for receiving the annularly flanged end portion 63 of an elastic deformable wear sleeve 64 having a tubular portion 65 extending inside the contractible tubular structure 62 from one end to the other end thereof. The wear sleeve 64 may be made of rubber, synthetic rubber or other rubber-like material. Since the internal diameter of the bore 66 through the wear sleeve 64 must be of suitable dimensions to permit passage of the flight conveyor, the internal diameter of the bore 55 through the contractible tubular structure 62 is larger than the corresponding diameter in Figure 1 by an amount increased by the wall thickness of the tubular portion 65 of the wear sleeve 64. The entrance and exit ends 67 and 68 respectively of the wear sleeve 64 are rounded to permit easy entrance and exit of the flight conveyor.

The manufacture and operation of the modified pressure-sealing device 60 are similar to that described in connection with Figures 1 and 2 and hence require no repetition. The wear sleeve 64 is not bonded to the contractible tubular structure 62 but is separate from it so as to be capable of removal and replacement when excessive wear has taken place. The modification of Figures 3 and 4, of course, cannot be used at temperatures as high as the form shown in Figures 1 and 2 because of the rubber-like wear sleeve 64 which will not stand the heat and cannot be cooled as conveniently as the tubular structure 36 of Figures 1 and 2. The modified pressure-sealing device 60, however, is found useful not only with respect to wear replacement but also where the nature of the material being conveyed makes it undesirable or impossible to expose metal thereto, thus requiring the metal bars 37 to be covered up and protected.

*Pressure sealing device with composite elastic deformable contractible structure*

The modified pressure sealing device, generally designated 70, shown in Figures 7 and 8 is also generally similar in construction to that shown in Figures 1 and 2 insofar as the casing structure 71 is concerned, and similar parts bear similar reference numerals. In place of the laminated metallic and elastic deformable tubular structure 36 of Figure 1, however, the contractible tubular structure 72 of Figure 7 includes a composite contractible tubular member 73 of elastic deformable material such as rubber or synthetic rubber attached to end rings 34 and 44 of similar construction to those shown in Figure 1. The composite tubular structure 73 consists of an outer tubular member 74 of relatively hard rubber or other rubber-like material which possesses relatively high structure strength and an inner tubular member 75 of relatively soft rubber lacking the high structural strength of the hard rubber of the outer tubular member 74 but possessing a greater resistance to wear. These two tubular members 74 and 75 of elastic deformable material are vulcanized together so as to form, in effect, a single unit and the outer tubular member 74 is similarly bonded to the end rings 34 and 44. The opposite ends 76 and 77 of the inner tubular member 75 are flared outward to facilitate entrance and exit of the flight conveyor generally designated 78, and the bore 79 of the inner member 75 is of suitable diameter to snugly engage the flight discs 80 of the flight conveyor 78. The bores 56 and 57 of the conduit portions 11 and 12, as before, are slightly larger in diameter than the diameter of the bore 79.

The flight conveyor 78 is of any conventional type, and its details form no part of the present invention. It may consist, as shown, of a conveyor chain generally designated 81 having inner and outer links 82 and 83 pivoted to one another as at 84 and carrying opposed clamping plates 85 between which the flight discs 80 are clamped, these in assembly forming the flights 78.

The modified tubular structure generally designated 86 shown in Figure 9, is similar to the tubular structure 72 of Figures 7 and 8 with the exception of the fact that the end rings 87 (one only being shown) are of elastic deformable material and are formed as flanges integral with the outer tubular member 74.

The assembly and operation of the modified pressure sealing device 70 are similar to that described in connection with Figures 1 to 4 inclusive and hence no repetition is required.

What I claim is:

1. A flight conveyor pressure-sealing device for insertion in a flight conveyor conduit system, said sealing device comprising an elongated casing structure attachable to said conduit system, and an elongated contractible tubular structure mounted within said casing in inwardly-spaced pressure-tight relationship therewith to provide an inflation chamber therebetween, said tubular structure having a multiplicity of circumferentially-spaced longitudinal bars arranged in a circular path, and a multiplicity of strips of elastic deformable material mounted in the spaces between said bars, said bars extending inwardly to the inner surface of said tubular structure and having exposed inner edges adapted to directly engage the flight conveyor.

2. A flight conveyor pressure-sealing device for insertion in a flight conveyor conduit system, said sealing device comprising an elongated casing structure attachable to said conduit system, and an elongated contractible tubular structure mounted within said casing in inwardly-spaced pressure-tight relationship therewith to provide an inflation chamber therebetween, said tubular structure having a multiplicity of circumferentially-spaced longitudinal bars arranged in a circular path, a multiplicity of strips of elastic deformable material mounted in the spaces between said bars, said bars extending inwardly to the inner surface of said tubular structure and having exposed inner edges adapted to directly engage the flight conveyor, and a layer of elastic deformable material encircling said tubular structure.

3. A flight conveyor pressure-sealing device for insertion in a flight conveyor conduit system, said sealing device comprising an elongated casing structure attachable to said conduit system, and an elongated contractible tubular structure mounted within said casing in inwardly-spaced pressure-tight relationship therewith to provide an inflation chamber therebetween, said tubular structure having an annular member connected to one end thereof in sealed engagement with said casing structure, a multiplicity of circumferentially-spaced longitudinal bars arranged in a circular path and connected to said annular member, and a multiplicity of strips of elastic deformable material mounted in the spaces between said bars, said bars extending inwardly to the inner surface of said tubular structure and having exposed inner edges adapted to directly engage the flight conveyor.

4. A flight conveyor pressure-sealing device for insertion in a flight conveyor conduit system, said sealing device comprising an elongated casing structure attachable to said conduit system, and an elongated contractible tubular structure mounted within said casing in inwardly-spaced pressure-tight relationship therewith to provide an inflation chamber therebetween, said tubular structure having a pair of longitudinally-spaced annular members, one annular member being connected to each end of said tubular structure in sealed engagement with said casing structure, a multiplicity of circumferentially-spaced longitudinal bars arranged in a circular path and extending between said annular members, and a multiplicity of strips of elastic deformable material mounted in the spaces between said bars, said bars extending inwardly to the inner surface of said tubular structure and having exposed inner edges adapted to directly engage the flight conveyor.

5. A flight conveyor pressure-sealing device for insertion in a flight conveyor conduit system, said sealing device comprising an elongated casing structure attachable to said conduit system, and an elongated contractible tubular structure mounted within said casing in inwardly-spaced pressure-tight relationship therewith to provide an inflation chamber therebetween, said tubular structure having an annular member connected to one end thereof in sealed engagement with said casing structure, a multiplicity of circumferentially-spaced longitudinal bars arranged in a circular path and connected to said annular member, and a multiplicity of strips of elastic deformable material mounted in the spaces between said bars, said annular member having a cavity therein and said bars having their ends adjacent said annular member secured in said cavity.

6. A flight conveyor pressure-sealing device for insertion in a flight conveyor conduit system, said sealing device comprising an elongated casing structure attachable to said conduit system, and an elongated contractible tubular structure mounted within said casing in inwardly-spaced pressure-tight relationship therewith to provide an inflation chamber therebetween, said tubular structure having an annular member connected to one end thereof in sealed engagement with said casing structure, a multiplicity of circumferentially-spaced longitudinal bars arranged in a circular path and connected to said annular member, and a multiplicity of strips of elastic deformable material mounted in the spaces between said bars, said annular member having a cavity therein and said bars having their ends adjacent said annular member secured in said cavity and a replaceable wear sleeve disposed within said tubular structure.

7. A flight conveyor pressure-sealing device for insertion in a flight conveyor conduit system, said sealing device comprising an elongated casing structure attachable to said conduit system, and an elongated contractible tubular structure mounted within said casing in inwardly-spaced pressure-tight relationship therewith to provide an inflation chamber therebetween, said tubular structure having an annular member connected to one end thereof in sealed engagement with said casing structure, a multiplicity of circumferentially-spaced longitudinal bars arranged in a circular path and connected to said annular member, a multiplicity of strips of elastic deformable material mounted in the spaces between said bars, said annular member having a cavity therein and said bars having their ends adjacent said annular member secured in said cavity and a replaceable wear sleeve disposed within said tubular structure and having a transversely extending end portion secured between one end of said tubular structure and the adjacent end of said conduit system.

8. A flight conveyor pressure-sealing device for insertion in a flight conveyor conduit system, said sealing device comprising an elongated casing structure attachable to said conduit system, and an elongated contractible tubular structure mounted within said casing in inwardly-spaced pressure-tight relationship therewith to provide an inflation chamber therebetween, said tubular structure having an annular member connected to one end thereof in sealed engagement with said casing structure, a multiplicity of circumferentially-spaced longitudinal bars arranged in a circular path and connected to said annular member, a multiplicity of strips of elastic deformable material mounted in the spaces between said bars, said annular member having a cavity therein and said bars having their ends adjacent said annular member secured in said cavity and a replaceable wear sleeve of elastic deformable material diposed within said tubular structure.

9. A flight conveyor pressure-sealing device for insertion in a flight conveyor conduit system, said sealing device comprising an elongated casing structure attachable to said conduit system, and an elongated contractible tubular structure mounted within said casing in inwardly-spaced pressure-tight relationship therewith to provide an inflation chamber therebetween, said tubular structure having an annular member connected to one end thereof in sealed engagement with said casing structure, a multiplicity of circumferentially-spaced longitudinal bars arranged in a circular path and connected to said annular member, a multiplicity of strips of elastic deformable material mounted in the spaces between said bars, said annular member having a cavity therein and said bars having their ends adjacent said annular member secured in said cavity and a replaceable wear sleeve of elastic deformable material disposed within said tubular structure and having a transversely-extending end portion secured between one end of said tubular structure and the adjacent end of said conduit system.

10. A flight conveyor pressure-sealing device for insertion in a flight conveyor conduit system, said sealing device comprising an elongated casing structure having an annular internal recess adjacent one end thereof attachable to said conduit system, and an elongated contractible tubular structure mounted within said casing in inwardly - spaced pressure - tight relationship therewith to provide an inflation chamber therebetween, said tubular structure having an annular member mounted in said recess, a multiplicity of circumferentially-spaced longitudinal bars arranged in a circular path and connected to said annular member, and a multiplicity of strips of elastic deformable material mounted in the spaces between said bars.

HENRY W. HAPMAN.

REFERENCES CITED

The following references are of record in the file of this patent:

UNITED STATES PATENTS

| Number | Name | Date |
|---|---|---|
| 1,048,019 | Wilson | Dec. 24, 1912 |
| 2,428,995 | Rogers | Oct. 14, 1947 |
| 2,478,326 | Scarth | Aug. 9, 1949 |

FOREIGN PATENTS

| Number | Country | Date |
|---|---|---|
| 834,316 | France | Nov. 17, 1938 |